US012539846B2

(12) United States Patent
Akiyama et al.

(10) Patent No.: US 12,539,846 B2
(45) Date of Patent: Feb. 3, 2026

(54) AUTOMATIC BRAKE CONTROL APPARATUS, AUTOMATIC BRAKE CONTROL METHOD, AND NON-TRANSITORY COMPUTER-READABLE RECORDING MEDIUM

(71) Applicant: SUBARU CORPORATION, Tokyo (JP)

(72) Inventors: Yuna Akiyama, Tokyo (JP); Koichi Mizutani, Tokyo (JP); Masayoshi Koiji, Tokyo (JP); Yusuke Hamada, Tokyo (JP); Kazuki Muto, Tokyo (JP); Tsubasa Takase, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 47 days.

(21) Appl. No.: 18/399,587

(22) Filed: Dec. 28, 2023

(65) Prior Publication Data
US 2024/0123979 A1  Apr. 18, 2024

Related U.S. Application Data

(63) Continuation of application No. PCT/JP2021/041022, filed on Nov. 8, 2021.

(51) Int. Cl.
B60W 30/09 (2012.01)
B60W 10/18 (2012.01)
(Continued)

(52) U.S. Cl.
CPC ............ *B60W 30/09* (2013.01); *B60W 10/18* (2013.01); *G01S 15/931* (2013.01);
(Continued)

(58) Field of Classification Search
CPC ................ B60W 30/06; B60W 30/09; B60W 30/18027; B60W 30/18036; B60W 40/09;
(Continued)

(56) References Cited

U.S. PATENT DOCUMENTS

2008/0189000 A1* 8/2008 Duong .................... B60T 7/22
340/928
2009/0009306 A1 1/2009 Magane et al.
(Continued)

FOREIGN PATENT DOCUMENTS

JP 2009-014560 A 1/2009
JP 2010-230366 A 10/2010
(Continued)

OTHER PUBLICATIONS

International Search Report issued in International Application No. PCT/JP2021/041022, dated Jan. 25, 2022 w/ English Translation.
(Continued)

*Primary Examiner* — Hai H Huynh
*Assistant Examiner* — Johnny H Hoang
(74) *Attorney, Agent, or Firm* — Rimon P.C.

(57) ABSTRACT

An automatic brake control apparatus to be applied to a vehicle is configured to: detect, with an ultrasonic sensor, a position of an obstacle on reverse travel of the vehicle, in which the ultrasonic sensor is disposed in a rear part of the vehicle; set a brake operation area on plane coordinates corresponding to the detected position by the ultrasonic sensor; and actuate an automatic brake. The brake operation area includes a low-speed operation area and a high-speed operation area. The low-speed operation area is set on the reverse travel at a lower speed than a setting vehicle speed, and the high-speed operation area is set on the reverse travel at a higher speed than the setting vehicle speed. The high- (Continued)

speed operation area is wider than the low-speed operation area at least in a vehicle widthwise direction.

5 Claims, 8 Drawing Sheets

(51) Int. Cl.
  *G01S 15/93* (2020.01)
  *G01S 15/931* (2020.01)
(52) U.S. Cl.
  CPC .............. *B60W 2554/4041* (2020.02); *B60W 2554/801* (2020.02); *B60W 2554/802* (2020.02)
(58) Field of Classification Search
  CPC ...... B60W 40/08; B60W 50/10; B60W 50/14; B60W 10/18; B60W 2510/1005; B60W 2540/225; B60W 2520/105; B60W 2050/143; B60W 2520/06; B60W 2510/10; B60W 2540/223; B60W 2520/04; G01S 15/876; G01S 15/931; G08G 1/16; B60T 7/12
  USPC ..................................................... 701/41–48
  See application file for complete search history.

(56) References Cited

U.S. PATENT DOCUMENTS

| | | | |
|---|---|---|---|
| 2010/0246327 A1 | 9/2010 | Yoshida et al. | |
| 2010/0259420 A1* | 10/2010 | Von Reyher | G08G 1/165 701/1 |
| 2013/0311083 A1 | 11/2013 | Mikami et al. | |
| 2015/0239437 A1* | 8/2015 | Ignaczak | B60T 8/171 701/70 |
| 2016/0084958 A1* | 3/2016 | Kim | G01S 7/521 367/100 |
| 2017/0332347 A1* | 11/2017 | Boss | H04W 24/08 |
| 2018/0090006 A1 | 3/2018 | Ikenouchi et al. | |
| 2019/0366950 A1* | 12/2019 | Kosugi | B60W 50/12 |
| 2020/0057453 A1* | 2/2020 | Laws | B60W 10/04 |
| 2021/0300349 A1 | 9/2021 | Hara et al. | |
| 2022/0315024 A1* | 10/2022 | Pusheck | B60W 30/18027 |
| 2024/0034318 A1* | 2/2024 | Goers | B60W 30/18036 |

FOREIGN PATENT DOCUMENTS

| | | |
|---|---|---|
| JP | 2017-043355 A | 3/2017 |
| JP | 2017-182300 A | 10/2017 |
| JP | 2018-054470 A | 4/2018 |
| JP | 2018-83550 A | 5/2018 |
| JP | 2020-085493 A | 6/2020 |
| JP | 2021-160477 A | 10/2021 |
| WO | 2012/120583 A1 | 9/2012 |

OTHER PUBLICATIONS

Office Action dated Jan. 28, 2025, from corresponding Japanese Application No. 2023-557594, 5 pages.
Office Action dated Jun. 24, 2025 from corresponding Japanese Application No. 2023-557594, 5 pages.
Office Action issued in the corresponding Japanese Patent Application No. 2023-557594 on Dec. 2, 2025, w/English Translation.

* cited by examiner

AUTOMATIC BRAKE CONTROL APPARATUS, AUTOMATIC BRAKE CONTROL METHOD, AND NON-TRANSITORY COMPUTER-READABLE RECORDING MEDIUM

CROSS-REFERENCE TO RELATED APPLICATIONS

This application is a continuation of International Application No. PCT/JP2021/041022, filed on Nov. 8, 2021, the entire contents of which are hereby incorporated by reference.

BACKGROUND

The disclosure relates to an automatic brake control apparatus using an ultrasonic sensor, an automatic brake control method, and a non-transitory computer-readable recording medium.

There has been known an obstacle detection apparatus that detects an obstacle with the use of a sensor that sends out ultrasonic waves or electromagnetic waves and receives reflected waves reflected from the obstacle. The obstacle detection apparatus detects an obstacle based on a result of reception of the reflected waves by the sensor. When the sensor sends out ultrasonic waves or electromagnetic waves, if an obstacle is present in a detection range of the sensor, ultrasonic waves, etc. sent out from the sensor reach the obstacle and are reflected from the obstacle. As a result, the sensor receives the reflected waves and detects the obstacle.

SUMMARY

An aspect of the disclosure provides an automatic brake control apparatus to be applied to a vehicle. The automatic brake control apparatus is configured to: detect, with an ultrasonic sensor, a position of an obstacle on reverse travel of the vehicle, in which the ultrasonic sensor is disposed in a rear part of the vehicle; set a brake operation area on plane coordinates corresponding to the detected position by the ultrasonic sensor; and actuate an automatic brake. The brake operation area includes a low-speed operation area and a high-speed operation area. The low-speed operation area is set on the reverse travel at a lower speed than a setting vehicle speed. The high-speed operation area is set on the reverse travel at a higher speed than the setting vehicle speed. The high-speed operation area is wider than the low-speed operation area at least in a vehicle widthwise direction of the vehicle.

An aspect of the disclosure provides an automatic brake control method to be applied to a vehicle. The automatic brake control method includes: detecting, with an ultrasonic sensor, a position of an obstacle on reverse travel of the vehicle, in which the ultrasonic sensor is disposed in a rear part of the vehicle; setting a brake operation area on plane coordinates corresponding to the detected position by the ultrasonic sensor; and actuating an automatic brake. The brake operation area includes a low-speed operation area and a high-speed operation area. The low-speed operation area is set on the reverse travel at a lower speed than a setting vehicle speed. The high-speed operation area is set on the reverse travel at a higher speed than the setting vehicle speed. The high-speed operation area is wider than the low-speed operation area at least in a vehicle widthwise direction of the vehicle.

An aspect of the disclosure provides a non-transitory computer-readable recording medium containing a program. The program causes, when executed by a computer, the computer to implement a method including: detecting, with an ultrasonic sensor, a position of an obstacle on reverse travel of a vehicle, in which the ultrasonic sensor is disposed in a rear part of the vehicle; and setting a brake operation area on plane coordinates corresponding to the detected position by the ultrasonic sensor. The brake operation area includes a low-speed operation area and a high-speed operation area. The low-speed operation area is set on the reverse travel at a lower speed than a setting vehicle speed. The high-speed operation area is set on the reverse travel at a higher speed than the setting vehicle speed. The high-speed operation area is wider than the low-speed operation area at least in a vehicle widthwise direction of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
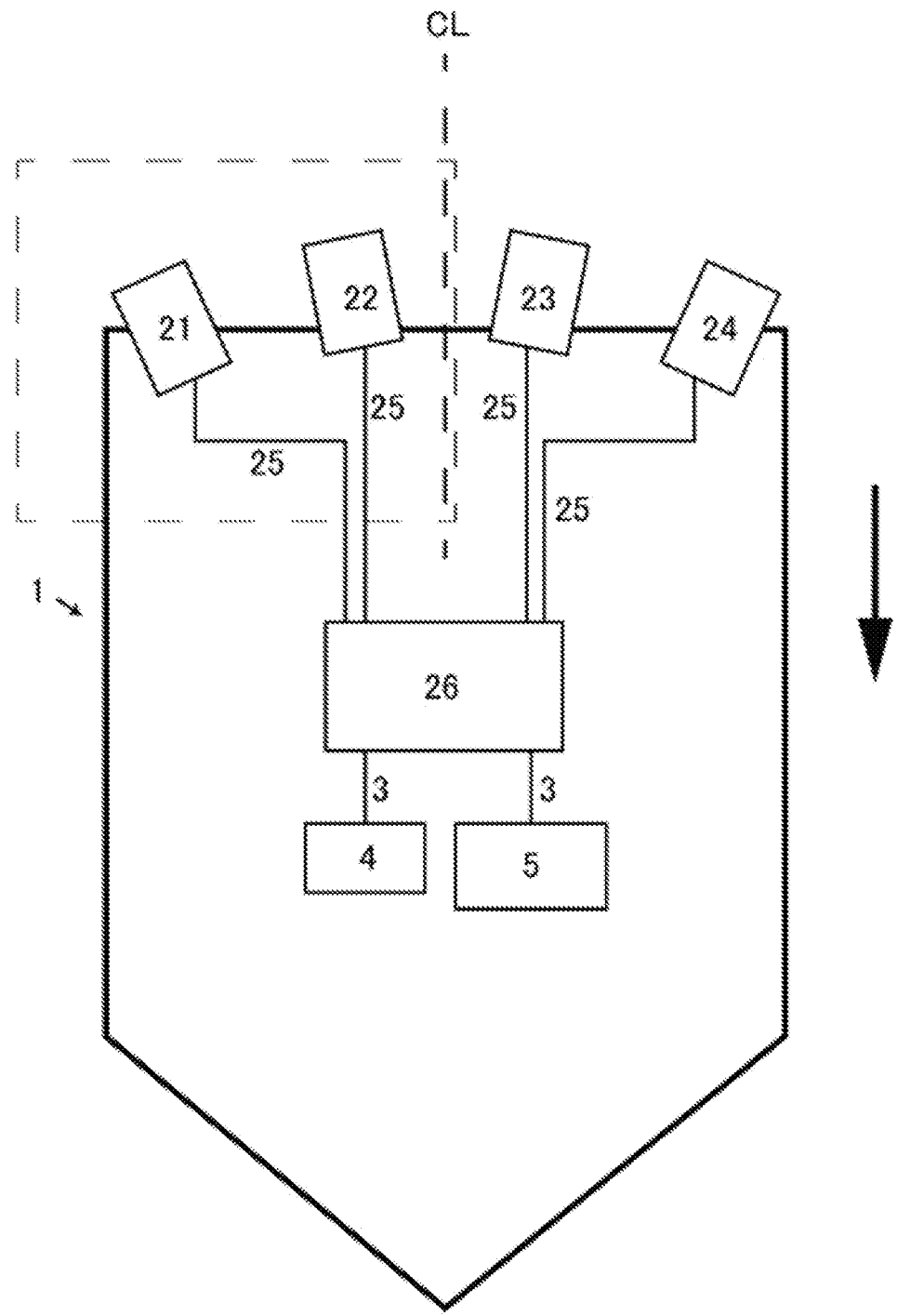
FIG. 1 illustrates a system configuration of a vehicle.

In a technique described in Japanese Unexamined Patent Application Publication (JP-A) No. 2018-83550, an obstacle in a brake operation area is detected by, for example, an ultrasonic sensor or a radar sensor disposed in a rear part of a vehicle, making it possible to automatically actuate a brake. However, radar sensors have a distant measurement range that allows for highly accurate detection, and cause the brake to be actuated by a distant obstacle. Thus, radar sensors are unsuitable for the use in obstacle detection on reverse travel of the vehicle, e.g., garaging. Moreover, it has been found, as a result of experiments, that ultrasonic sensors detect an obstacle at a displaced position, when a reverse speed of the vehicle is high to some extent. This hinders actuation of an automatic brake, causing possibility that the vehicle comes too close to the obstacle. If an operation area is expanded to detect the obstacle at the displaced position, there is possibility that the brake is actuated by an obstacle at a position where the vehicle does not come into contact with the obstacle on low-speed reverse travel. It is desirable to make an optimal automatic brake control with the use of an ultrasonic sensor.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 illustrates a system configuration of a vehicle 1 on which an automatic brake control apparatus 2 according to an embodiment of the disclosure is mounted. An arrow illustrated on the right denotes a direction toward front of the vehicle 1. A direction in which the arrow extends is a vehicle lengthwise direction. A direction orthogonal to the arrow is a vehicle widthwise direction. The vehicle 1 may include four ultrasonic sensors, e.g., a first ultrasonic sensor 21, a second ultrasonic sensor 22, a third ultrasonic sensor 23, and a fourth ultrasonic sensor 24, arranged in a lateral direction in a rear part of the vehicle 1. The first ultrasonic sensor 21, the second ultrasonic sensor 22, the third ultrasonic sensor 23, and the fourth ultrasonic sensor 24 may be coupled to an electronic control unit (ECU) 26 through sensor signal lines 25. The ECU 26 may include a computer. The ECU 26 may receive output signals from the first to fourth ultrasonic sensors 21 to 24. Moreover, the ECU 26 is coupled to a vehicle speed sensor 4 and a braking system 5 through signal lines 3.

The fourth ultrasonic sensor 24 and the third ultrasonic sensor 23 may be disposed in symmetry to the first ultrasonic sensor 21 and the second ultrasonic sensor 22 with respect to a central axis CL of the vehicle 1. The fourth ultrasonic sensor 24 and the third ultrasonic sensor 23 may have similar operation to those of the first ultrasonic sensor 21 and the second ultrasonic sensor 22. Thus, description is given of the first ultrasonic sensor 21 and the second ultrasonic sensor 22 illustrated within a rectangle in dotted line.

The ECU 26 may intermittently generate and send out ultrasonic waves from the first ultrasonic sensor 21. The ECU 26 may detect a position of a nearby obstacle based on delay time T of reflected waves received by the first ultrasonic sensor 21 and the second ultrasonic sensor 22. The delay time T is time from the sending out of the ultrasonic waves to the reception of the reflected waves. The position of the obstacle may be represented by coordinates in longitudinal and lateral directions with reference to the vehicle 1.

Figure 2:
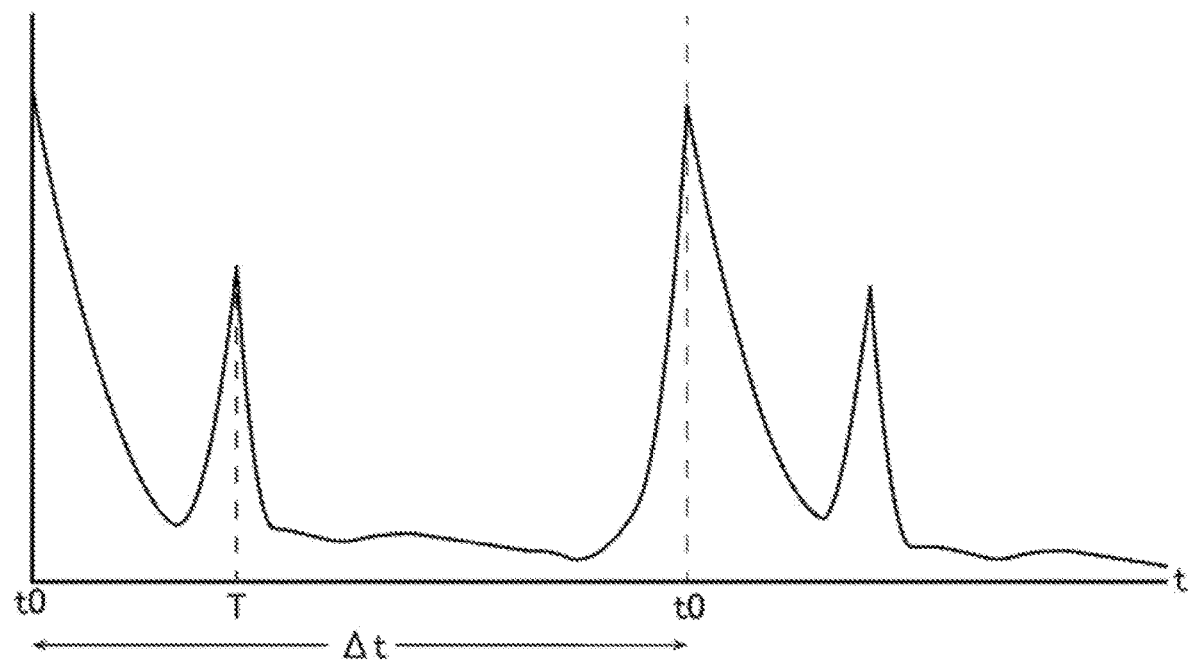
FIG. 2 illustrates an example of a waveform received by an ultrasonic sensor.

FIG. 2 illustrates an example of a waveform received by an ultrasonic sensor. The horizontal axis represents time, and the vertical axis represents intensity of the received waves. Pulsed ultrasonic waves may be repeatedly generated every detection period Δt. The detection period Δt may be set to time sufficiently longer than the delay time T from the sending out of the ultrasonic waves to the reception of the reflected waves. In FIG. 2, in the vicinity of the time t0 at which the ultrasonic waves are generated, the generated waves are captured. At the delay time T, the reflected waves are captured. Accordingly, it is possible to measure a distance to the obstacle based on the delay time T and the speed of sound in the air. Thus, with the four ultrasonic sensors disposed in the rear part of the vehicle 1, namely, the first ultrasonic sensor 21, the second ultrasonic sensor 22, the third ultrasonic sensor 23, and the fourth ultrasonic sensor 24, the position of the obstacle on the reverse travel of the vehicle is detected, causing the automatic brake to be actuated.

Figure 3:
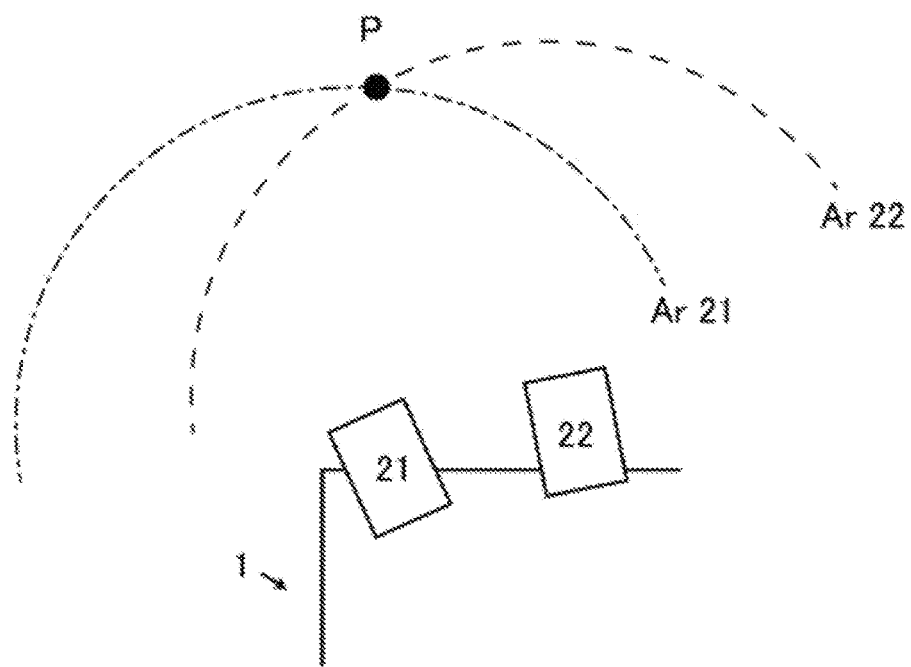
FIG. 3 illustrates detection of an obstacle rearward of the vehicle.

The coordinates at which the obstacle is present lie on a curve of a circular arc Ar centered on a position of reception by the ultrasonic sensor and having a radius of the measured distance. FIG. 3 illustrates detection of an obstacle position. It is possible to obtain a distance to the obstacle position based on delay time T21 detected by the first ultrasonic sensor 21 and delay time T22 detected by the second ultrasonic sensor 22. FIG. 3 illustrates an arc Ar21 having a radius of the distance indicated by the delay time T21, and an arc Ar22 having a radius of the distance indicated by the delay time T22. It is possible to detect obstacle coordinates P as an intersection of the arc Ar21 and the arc Ar22.

Figure 4:
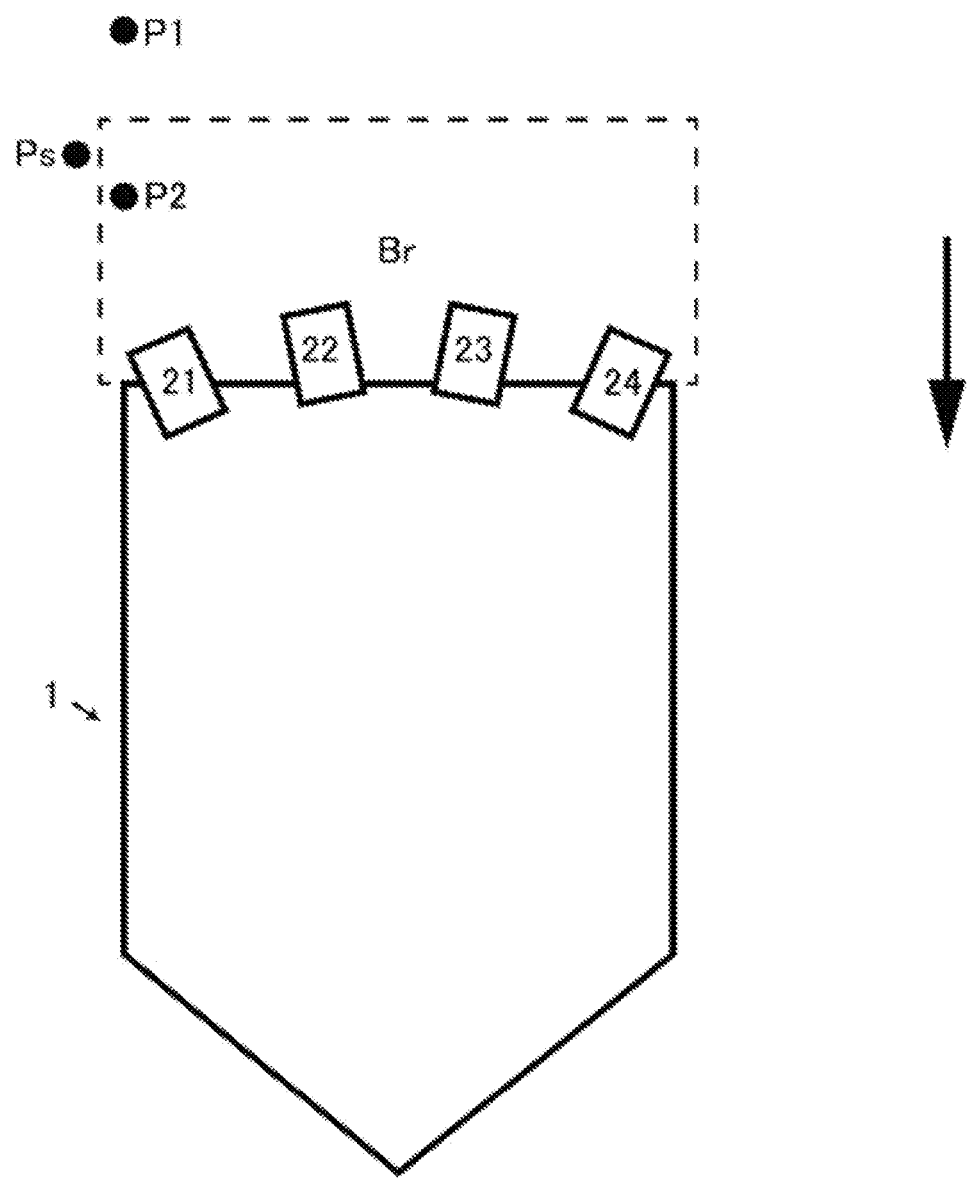
FIG. 4 illustrates a brake operation area of the vehicle.

When the obstacle coordinates P thus obtained are within a predetermined range as viewed from the vehicle 1, the vehicle 1 may automatically actuate the brake. FIG. 4 illustrates a brake operation area Br in dotted lines. The brake operation area Br is an area in which the brake is automatically actuated. When the vehicle 1 reverses, if an obstacle is detected at obstacle coordinates P1, the automatic brake control apparatus 2 does not actuate the brake because the obstacle is outside the brake operation area Br. When the vehicle 1 further reverses, and the position of the obstacle is at obstacle coordinates P2, the automatic brake control apparatus 2 automatically actuates the brake to stop the vehicle 1 because the obstacle is in the brake operation area Br. Thus, it is possible to avoid coming into contact with the obstacle on the reverse travel of the vehicle 1.

However, a phenomenon has been found, based on experiments, that on high-speed reverse travel at a higher reverse speed, the detected position shifts outward from the brake operation area Br. In this phenomenon, when the obstacle is located at a position of the obstacle coordinates P2 in FIG. 4, the obstacle is detected at a position of shifted coordinates Ps. One possible reason for this phenomenon is that the first ultrasonic sensor 21 and the second ultrasonic sensor 22 approach the obstacle as a source of the reflected waves, after the first ultrasonic sensor 21 sends out ultrasonic waves and before the reflected waves reach the first ultrasonic sensor 21 and the second ultrasonic sensor 22. When the obstacle is present near sideward of the brake operation area Br, a route of the reflected waves toward the second ultrasonic sensor 22 located near the center is less likely to become shorter on the reverse travel than a route of the reflected waves toward the first ultrasonic sensor 21 located sideward. On high-speed reverse travel, effects of this phenomenon become large enough for the shift of the detected position to the shifted coordinate Ps to have influences on actuation of the brake. Another possible reason for this phenomenon is that, for example, when reflected waves are received while the vehicle 1 is moving, it is difficult to receive a range in which sound pressure of the reflected waves is high. Thus, even when the obstacle is located in the brake operation area Br where the brake ought to be actuated automatically, the automatic brake is not actuated, resulting in a delay in braking.

First Example

In a first example, a reverse speed may be detected. The reverse speed may be obtained from the vehicle speed sensor 4. On low-speed reverse travel at a lower reverse speed than a predetermined speed, the automatic brake may be actuated when the position of the obstacle is detected in a low-speed operation area BL illustrated in FIG. 5. On high-speed reverse travel at a higher reverse speed than the predetermined speed, the automatic brake may be actuated when the position of the obstacle is detected in a high-speed operation area BH illustrated in FIG. 5. An operation area BS in which the brake is actuated may be set to plane coordinates corresponding to positions to be detected by the four ultrasonic sensors, namely, the first ultrasonic sensor 21, the second ultrasonic sensor 22, the third ultrasonic sensor 23, and the fourth ultrasonic sensor 24. The operation area BS includes the low-speed operation area BL and the high-speed operation area BH. The low-speed operation area BL is set on the reverse travel at a lower speed than a setting vehicle speed Vt. The high-speed operation area BH is set on the reverse travel at a higher speed than the setting vehicle speed Vt.

Figure 5:
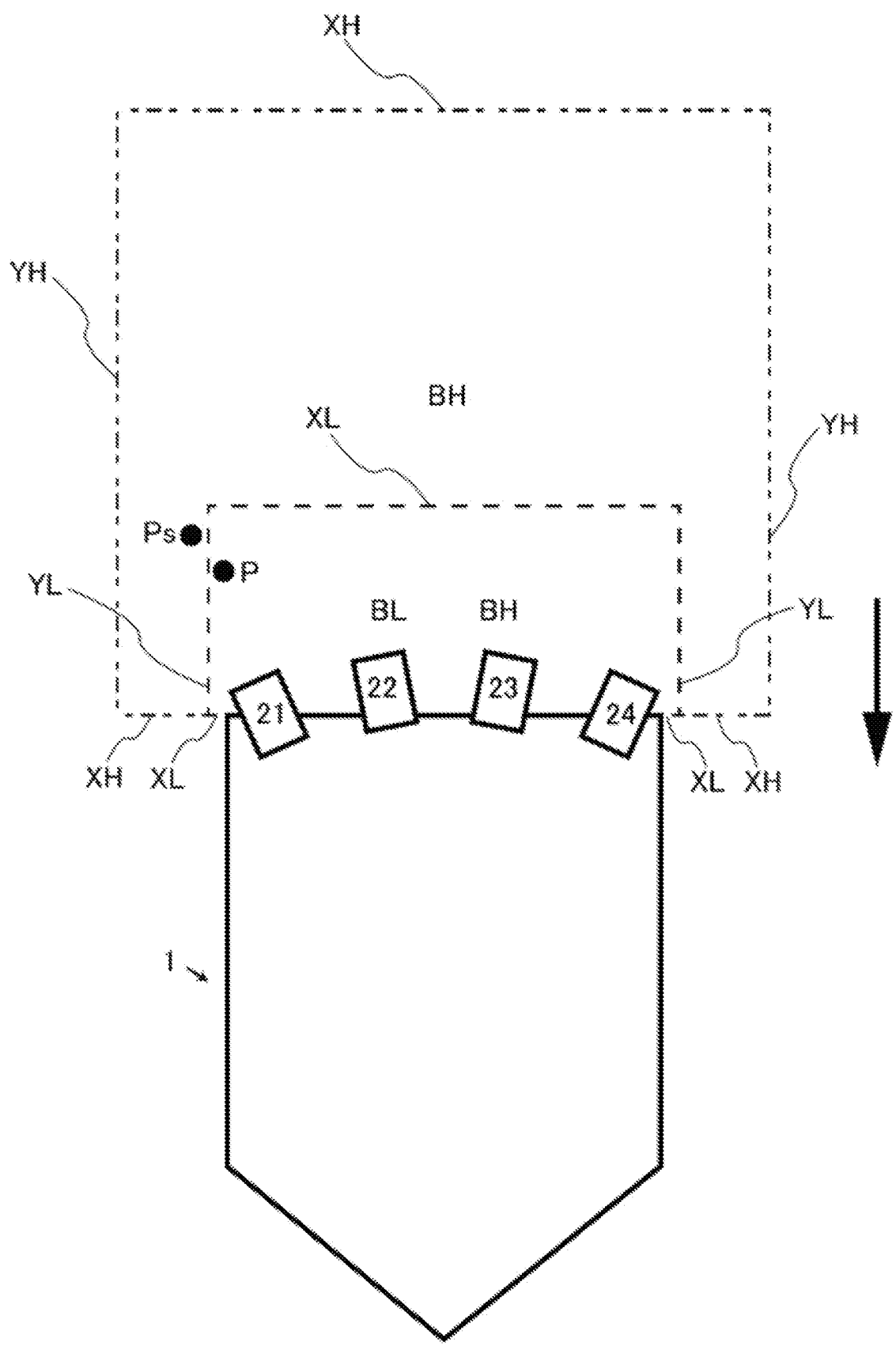
FIG. 5 illustrates a low-speed operation area and a high-speed operation area of the vehicle.

The high-speed operation area BH and the low-speed operation area BL may each be a rectangular region set by lateral contact determination lines and longitudinal contact determination lines. The lateral contact determination lines define the vehicle widthwise direction. The longitudinal contact determination lines define the vehicle lengthwise direction. The high-speed operation area BH and the low-speed operation area BL may each be a region inside the rectangle. As illustrated in FIG. 5, the low-speed operation area BL may be a rectangular region set by lateral contact determination lines YL and longitudinal contact determination lines XL. The high-speed operation area BH may be a rectangular region set by lateral contact determination lines YH and longitudinal contact determination lines XH. The high-speed operation area BH may be a region including the low-speed operation area BL. The high-speed operation area BH may be wider than the low-speed operation area BL in the vehicle widthwise direction of the vehicle 1. Moreover, in the first example, the high-speed operation area BH may be wider rearward than the low-speed operation area BL. Setting the high-speed operation area BH and the low-speed operation area BL as the rectangular regions makes it possible to easily determine whether or not the obstacle coordinates P are in the operation area BS. This leads to reduction in a load on the ECU 26.

Figure 6:
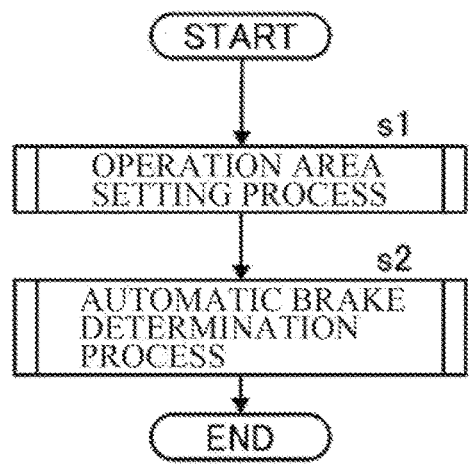
FIG. 6 is a flowchart of a basic flow in an example.

Description is given next of a flowchart of the first example. FIG. 6 illustrates a basic flow. This flow may be started when the vehicle 1 reverses. At least at the start of the flow, positions on plane coordinates of the low-speed operation area BL and the high-speed operation area BH, and the setting vehicle speed Vt may be held in a memory of the ECU 26. When the vehicle 1 reverses, in an operation area setting process in step s1, the operation area BS in which the automatic brake is actuated may be set. Thereafter, in an automatic brake determination process in step s2, it may be determined whether or not to actuate the automatic brake. This flow may be repeated as long as the vehicle 1 is reversing.

Figure 7:
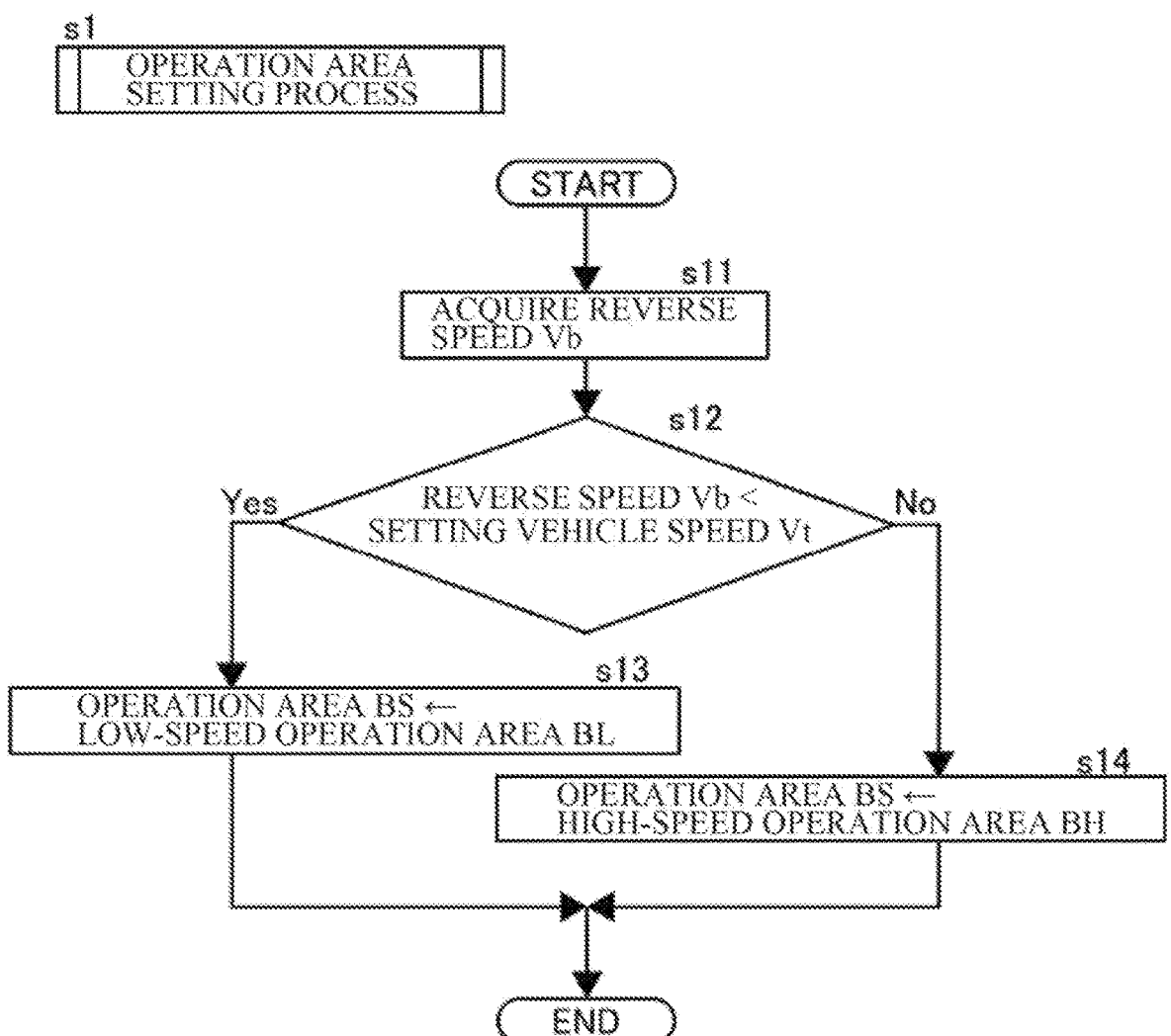
FIG. 7 is a flowchart of an operation area setting processing flow in the example.

In the operation area setting process in step s1 illustrated in FIG. 7, in step s11, a reverse speed Vb may be acquired. Thereafter, in step s12, it may be determined whether or not the reverse speed Vb is smaller than the setting vehicle speed Vt. When the reverse speed Vb is smaller than the setting vehicle speed Vt (Yes in step s12), in step s13, the low-speed operation area BL illustrated in FIG. 5 may be set as the operation area BS. When the reverse speed Vb is not smaller than the setting vehicle speed Vt (No in step s12), in step s14, the high-speed operation area BH may be set as the operation area BS.

Figure 8:
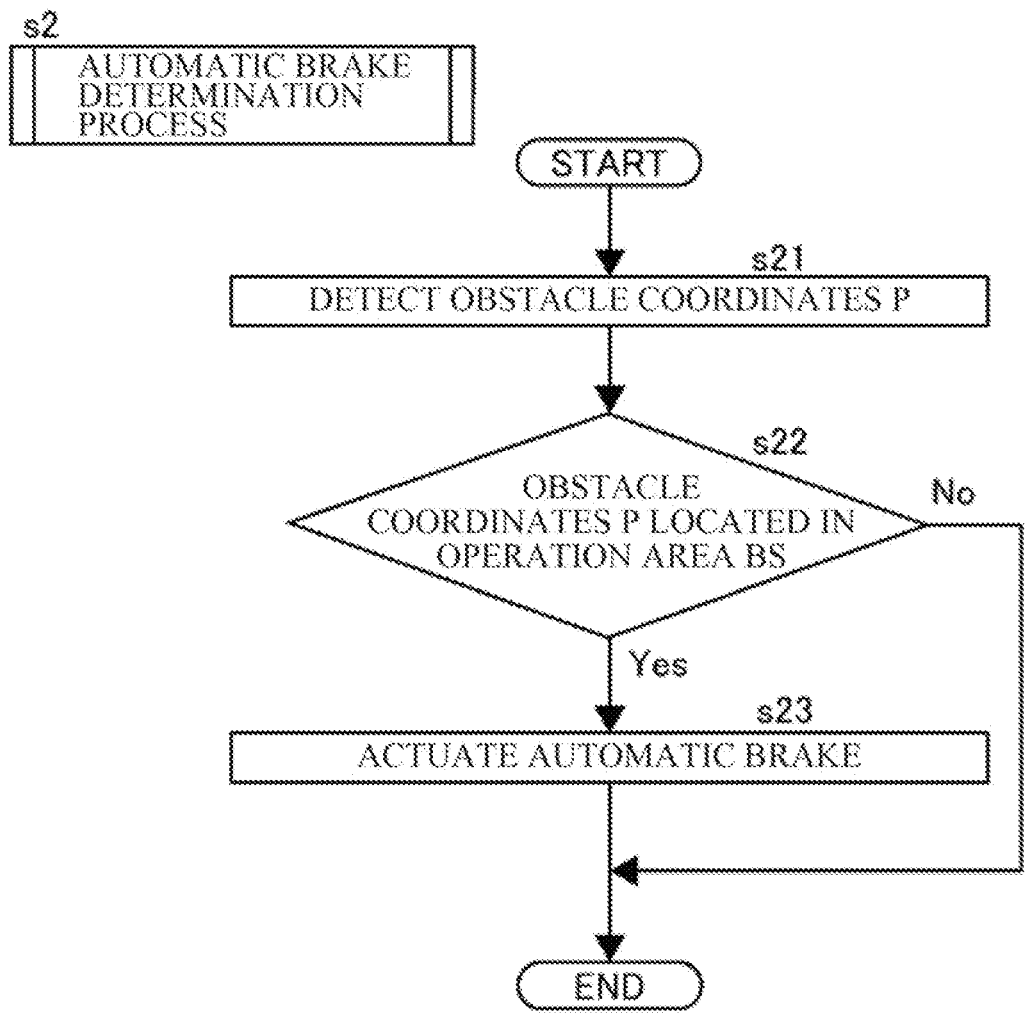
FIG. 8 is a flowchart of an automatic brake determination processing flow in the example.

In the automatic brake determination process in step s2 illustrated in FIG. 8, in step s21, the obstacle coordinates P may be detected by the first ultrasonic sensor 21 to the fourth ultrasonic sensor 24. The delay time T of the reflected waves on the right rear side of the vehicle 1 may be detected by the first ultrasonic sensor 21 and the second ultrasonic sensor 22, and the delay time T of the reflected waves on the left rear side of the vehicle 1 may be detected by the third ultrasonic sensor 23 and the fourth ultrasonic sensor 24, to calculate the obstacle coordinates P. Thereafter, in step s22, it may be determined whether or not the obstacle coordinates P are in the operation area BS. When the obstacle coordinates P are in the operation area BS (Yes in step s22), in step s23, the automatic brake is actuated. When the obstacle coordinates P are not in the operation area BS (No in step s22), the automatic braking is not actuated.

With the flow described above, as illustrated in FIG. 5, the lateral contact determination lines YH extend outward of the shifted coordinates Ps in the vehicle widthwise direction. The lateral contact determination lines YH define the vehicle widthwise direction of the high-speed operation area BH. Accordingly, as illustrated in FIG. 4, it is possible to actuate the automatic brake even when the original obstacle coordinates P are detected at the position of the shifted coordinates Ps on the high-speed reverse travel. Moreover, on the low-speed reverse travel, the low-speed operation area BL is set as the operation area BS. The low-speed operation area BL has the lateral contact determination lines YL located inward in the vehicle widthwise direction. The lateral contact determination lines YL define the vehicle widthwise direction. This hinders the automatic brake from being actuated when the vehicle reverses at a low speed in a narrow place.

Second Example

Figure 9:
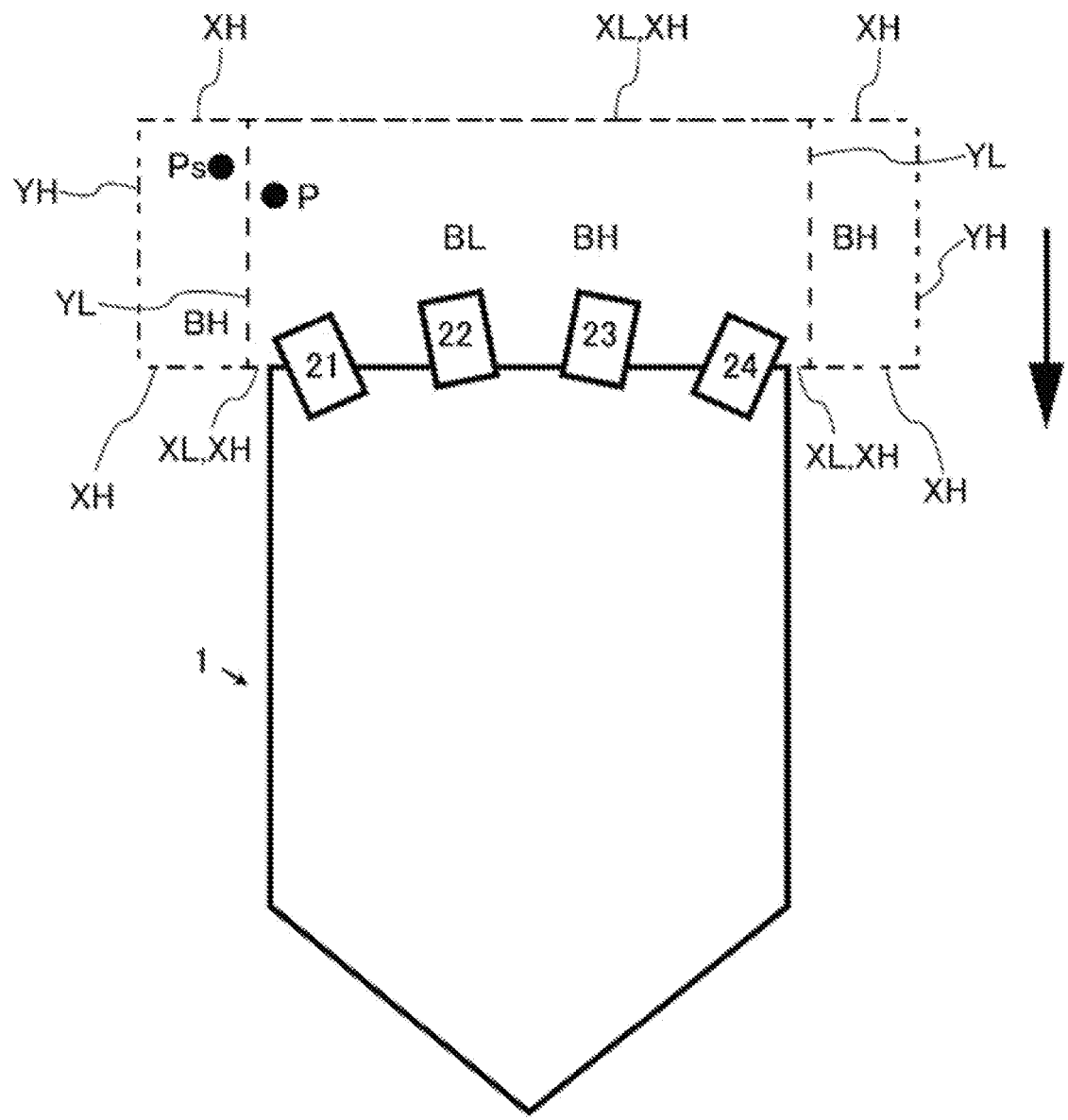
FIG. 9 illustrates a low-speed operation area and a high-speed operation area in an example.

FIG. 9 illustrates the low-speed operation area BL and the high-speed operation area BH according to a second example. In the second example, the low-speed operation area BL is the same as that in the first embodiment, but the high-speed operation area BH is different. In the second example, the high-speed operation area BH does not extend rearward but is wider in the vehicle widthwise direction than the low-speed operation area BL. In the second example as well, on the high-speed reverse travel, as illustrated in FIG. 9, even when an obstacle having the obstacle coordinates P is detected at the position of the shifted coordinate Ps, the automatic brake is actuated. Moreover, on the low-speed reverse travel, it is determined whether or not to actuate the automatic brake, based on the low-speed operation area BL that is narrow in the vehicle widthwise direction. This suppresses the automatic brake from being actuated to cause a stop of the vehicle 1 when the vehicle 1 is reversing at a low speed in a narrow place.

Third Example

Figure 10:
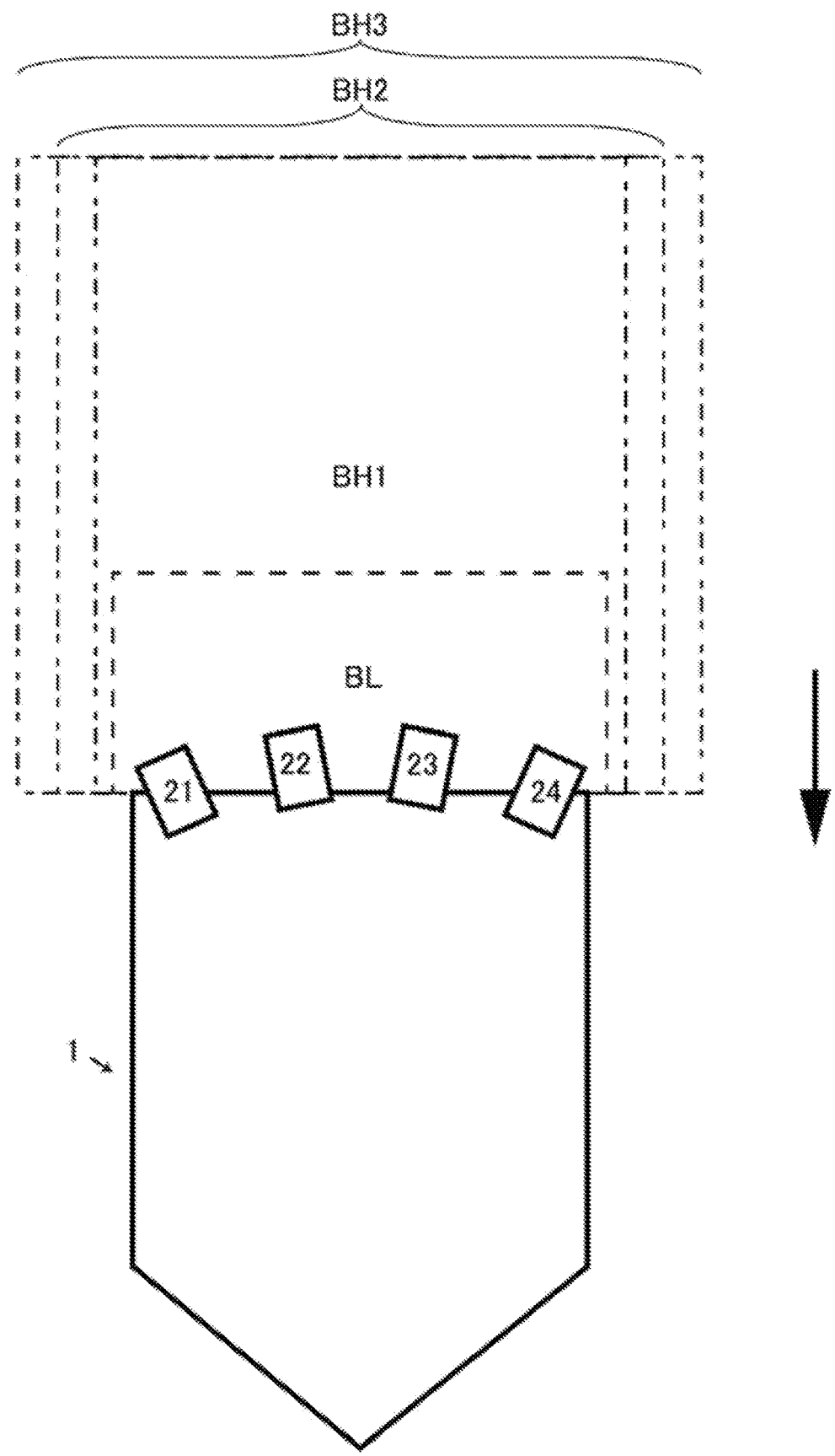
FIG. 10 illustrates a low-speed operation area and a high-speed operation area in an example.

In a third example, the operation area expands in multiple stages from the low-speed reverse travel to the high-speed reverse travel. FIG. 10 illustrates the low-speed operation area BL and high-speed operation areas BH1 to BH3 of the third example. In the third example, the low-speed operation area BL is the same as those in the first and second examples. When the reverse speed Vb reaches the setting vehicle speed Vt, the high-speed operation area BH1 may be set as the operation area BS. When the reverse speed Vb further increases, the operation area BS may be widened in the multiple stages in the vehicle widthwise direction, and extend to the high-speed operation area BH3 through the high-speed operation area BH2. By appropriately designing a width of the extension in the vehicle widthwise direction with respect to the reverse speed Vb, it is possible to provide a balance between the detection of the shifted coordinates Ps including displacement and elimination of unnecessary actuation of the automatic brake on the low-speed reverse travel.

In a flow of the third example, in the operation area setting process in step s1 in FIG. 7, multiple determination processes may be carried out with respect to multiple setting vehicle speeds. Thereafter, any one of the low-speed operation area BL, the high-speed operation area BH1, the high-speed operation area BH2, and the high-speed operation area BH3 may be set as the operation area BS. In the third example, the high-speed operation area may be provided in three stages. However, the high-speed operation area may be provided in two stages, or alternatively, the high-speed operation area may be provided in four or more stages.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof. Moreover, it is possible to make a combination of the forgoing example embodiments by applying technology of the example embodiments to one another as long as their purposes and configurations are not particularly inconsistent or the combination is disadvantageous.

The flows described in the examples illustrate an automatic brake control method to be applied to a vehicle. The flows described above are programs that cause a computer to implement a method including: detecting, with an ultrasonic sensor, a position of an obstacle on reverse travel of the vehicle, in which the ultrasonic sensor is disposed in a rear part of the vehicle 1; and setting a brake operation area on plane coordinates corresponding to the detected position by the ultrasonic sensor. The programs may be held in a non-transitory computer-readable recording medium as obstacle detection programs.

As described, according to the automatic brake control apparatus of the forgoing embodiment and the forgoing examples, it is possible to actuate the automatic brake even when the obstacle is detected at the displaced position on the high-speed reverse travel. On the low-speed reverse travel, it is possible to set the brake operation area suitable for the low-speed reverse travel.

As used herein, the term "collision" may be used interchangeably with the term "contact".

The ECU 26 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 26. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ECU 26 illustrated in FIG. 1.

The invention claimed is:

1. An automatic brake control apparatus to be applied to a vehicle, the automatic brake control apparatus being configured to:
    detect a reverse speed of the vehicle;
    set one of a plurality of brake operation areas in a coordinate plane rearward of the vehicle, based on the detected reverse speed;
    detect, with an ultrasonic sensor disposed in a rear part of the vehicle, a position of an obstacle located rearward of the vehicle during reverse travel;
    determine that the obstacle is located in the one of the plurality of brake operation areas;
    actuate an automatic brake in response to determining that the obstacle is located in the one of the plurality of brake operation areas,
    wherein the plurality of brake operation areas includes (1) a low-speed operation area that is set when the reverse speed of the vehicle is lower than a predetermined vehicle speed, and (2) a high-speed operation area that is set when the reverse speed of the vehicle is higher than the predetermined vehicle speed, and
    wherein the high-speed operation area is wider than the low-speed operation area at least in a vehicle widthwise direction.

2. The automatic brake control apparatus according to claim 1, wherein
    the brake operation area is a rectangular region defined by lateral contact determination lines and longitudinal contact determination lines,
    the lateral contact determination lines define the vehicle widthwise direction, and
    the longitudinal contact determination lines define a vehicle lengthwise direction.

3. The automatic brake control apparatus according to claim 1, wherein when the reverse speed of the vehicle is higher than the predetermined vehicle speed, the high-speed operation area widens only in the vehicle widthwise direction as the reverse speed increases.

4. An automatic brake control method to be applied to a vehicle, the automatic brake control method comprising:
    detecting a reverse speed of the vehicle;
    setting one of a plurality of brake operation areas in a coordinate plane rearward of the vehicle, based on the detected reverse speed;
    detecting, with an ultrasonic sensor disposed in a rear part of the vehicle, a position of an obstacle located rearward of the vehicle during reverse travel;
    determining that the obstacle is located in the one of the plurality of brake operation areas; and
    actuating an automatic brake in response to determining that the obstacle is located in the one of the plurality of brake operation areas,
    wherein the plurality of brake operation areas includes (1) a low-speed operation area that is set when the reverse speed of the vehicle is lower than a predetermined vehicle speed, and a high-speed operation area that is set when the reverse speed of the vehicle is higher than the predetermined vehicle speed, and wherein the high-speed operation area is wider than the low-speed operation area at least in a vehicle widthwise direction.

5. A non-transitory computer-readable recording medium containing a program, the program causing, when executed by a computer, the computer to implement a method comprising:

detecting a reverse speed of a vehicle;

setting one of a plurality of brake operation areas in a coordinate plane rearward of the vehicle, based on the detected reverse speed;

detecting, with an ultrasonic sensor disposed in a rear part of the vehicle, a position of an obstacle located rearward of the vehicle during reverse travel;

determining that the obstacle is located in the one of the plurality of brake operation areas; and actuating an automatic brake in response to determining that the obstacle is located in the one of the plurality of brake operation areas, wherein the plurality of brake operation areas includes (1) a low-speed operation area that is set when the reverse speed of the vehicle is lower than a predetermined vehicle speed, and a high-speed operation area that is set when the reverse speed of the vehicle is higher than the predetermined vehicle speed, and wherein the high-speed operation area is wider than the low-speed operation area at least in a vehicle widthwise direction.

* * * * *